July 29, 1969 J. M. BLANK ET AL 3,458,779

SiC P-N JUNCTION ELECTROLUMINESCENT DIODE WITH A DONOR CONCENTRATION DIMINISHING FROM THE JUNCTION TO ONE SURFACE AND AN ACCEPTOR CONCENTRATION INCREASING IN THE SAME REGION

Filed Nov. 24, 1967 5 Sheets-Sheet 1

Inventors:
John M. Blank
Ralph M. Potter
by Ernest W. Legree
Their Attorney

July 29, 1969 J. M. BLANK ET AL 3,458,779

SiC P-N JUNCTION ELECTROLUMINESCENT DIODE WITH A DONOR CONCENTRATION DIMINISHING FROM THE JUNCTION TO ONE SURFACE AND AN ACCEPTOR CONCENTRATION INCREASING IN THE SAME REGION

Filed Nov. 24, 1967 5 Sheets-Sheet 2

Inventors:
John M. Blank
Ralph M. Potter
by
Their Attorney

SiC P-N JUNCTION ELECTROLUMINESCENT DIODE WITH A DONOR CONCENTRATION DIMINISHING FROM THE JUNCTION TO ONE SURFACE AND AN ACCEPTOR CONCENTRATION INCREASING IN THE SAME REGION

Filed Nov. 24, 1967 5 Sheets-Sheet 3

Inventors:
John M. Blank
Ralph M. Potter
by
Their Attorney

S C P-N JUNCTION ELECTROLUMINESCENT DIODE WITH A DONOR CONCENTRATION DIMINISHING FROM THE JUNCTION TO ONE SURFACE AND AN ACCEPTOR CONCENTRATION INCREASING IN THE SAME REGION

Filed Nov. 24, 1967 5 Sheets-Sheet 4

Inventors:
John M. Blank
Ralph M. Potter
by [signature]
Their Attorney

S C P-N JUNCTION ELECTROLUMINESCENT DIODE WITH A DONOR CONCENTRATION DIMINISHING FROM THE JUNCTION TO ONE SURFACE AND AN ACCEPTOR CONCENTRATION INCREASING IN THE SAME REGION

Filed Nov. 24, 1967 5 Sheets-Sheet 5

1900°C 2000°C 2100°C 2200°C 2300°C
DIFFUSION TEMPERATURE

Inventors:
John M. Blank
Ralph M. Potter
by [signature]
Their Attorney

United States Patent Office 3,458,779
Patented July 29, 1969

3,458,779
SiC P-N JUNCTION ELECTROLUMINESCENT DIODE WITH A DONOR CONCENTRATION DIMINISHING FROM THE JUNCTION TO ONE SURFACE AND AN ACCEPTOR CONCENTRATION INCREASING IN THE SAME REGION

John M. Blank, Cleveland Heights, and Ralph M. Potter, Pepper Pike, Ohio, assignors to General Electric Company, a corporation of New York Filed Nov. 24, 1967, Ser. 685,447
Int. Cl. H01l 3/00, 5/00
U.S. Cl. 317—234 19 Claims

ABSTRACT OF THE DISCLOSURE

A light-emitting SiC diode having higher brightness and lower resistance has been achieved with a diffused junction having a steeper gradient and a narrower space charge width resulting from a donor concentration diminishing in one direction away from the junction and an acceptor concentration diminishing in the opposite direction. In one way of preparing them, nitrogen-doped alpha-SiC crystals are placed in a porous graphite crucible and surrounded by a protective charge of powdered silicon and carbon. The dopants for diffusion—boron and aluminum—are added to the silicon-carbon mixture which is purged of nitrogen before heating. The optimum boron concentration varies with the diffusion temperature which is preferably higher than 1900° C. Out-diffusion of nitrogen occurring simultaneously with in-diffusion of boron results in a steep gradient in the excess concentration of the diffused acceptor impurities over donor impurities and a small space charge width at the junction between n and p regions.

BACKGROUND OF THE INVENTION

The invention relates to light-emitting diodes of silicon carbide which are also referred to as solid-state lamps.

While it has long been known that selected crystals of silicon carbide exhibit electroluminescence under proper conditions, the brightness was low and no practical process for making light-emitting diodes of SiC has existed.

Manufacture of silicon carbide

Silicon carbide for industrial use is produced by the Acheson process (E. G. Acheson, "Carborundum, Its History Manufacture and Uses," J. Franklin Institute, September 1893). In the Acheson process, a mixture of sand and coke along with sawdust is heated electrically in a furnace containing a carbon core heating elements providing a temperature of about 2800° C. Starting at about 1500° C., the reaction $$SiO_2 + 3C \rightarrow SiC + 2CO$$

occurs. Shrinkage of the sawdust renders the mixture porous permitting smooth escape of the CO, and the SiC remains whose main industrial use is as an abrasive for grinding tools. Sometimes large, well-developed crystals are formed at favored locations in the mass. Occasionally p-n junctions occur accidentally in some of these crystals due to impurities in the starting ingredients. These crystals and p-n junctions have been objects of study by numerous scientists foremost amongst whom has been Lossew (O. Lossev, Wireless World and Radio Review, 271, 93 (1924)) who is credited with the discovery of injection electroluminescence, and Lehovec, Accardo, and Jamgochian (K. Lehovec, C. A. Accardo, and E. Jamgochian, Phys. Rev., 89, 20 (1953)) who correctly interpreted the mechanism of light production.

SiC crystal growing

A significant advance in the method of growing SiC crystals was described by J. A. Lely in Ber. Deut. Keram. Ges., 32, 229 (1955), and made possible the growth of SiC crystals with deliberately formed p-n junctions. In the Lely process, a mass of technical grade SiC is molded into a cylindrical shape with a void in its interior and heated in an inert atmosphere (helium or argon) to about 2500° C. Large SiC crystals grow in the void and dopant elements such as nitrogen, boron or aluminum may be incorporated in the growing crystals by adding them to the ambient inert atmosphere. (J. A. Lely and F. A. Kroger, "Semiconductors and Phosphors," M. Schon and H. Welker, Editor, Interscience, New York (1958).

Grown junctions

Changing from an n-type dopant such as nitrogen to a p-type dopant such as boron or aluminum during the crystal growth process produces a p-n junction and such junctions are known as "grown junctions." Diodes made from such junctions have been objects of study and development for many years (Proc. Conf. on Silicon Carbide, Boston, April 1959, Pergamon Press, 1960, p. 281). In general, obtaining useful electroluminescent junctions by changing the dopants during crystal growth has proved impractical for light-emitting diode manufacture.

Alloy junctions

Silicon carbide crystals grown by the Lely process and homogeneously doped with nitrogen, whereby they are entirely n-type, are suitable for making p-n junctions by alloying. Alloyed junctions are made, for example, by melting an alloy such as one of aluminum and silicon in contact with an n-type SiC crystal and raising the temperature of both crystal and Al-Si alloy until the SiC at the interface melts and mixes with the alloy. Upon cooling and solidifying, a layer of Al-doped SiC is formed according to Hall (R. N. Hall, J. Appl. Phys., 29, 914 (1958)). In these diodes reasonable control of process was achieved but acceptable performance as light producers was lacking.

Junctions by traveling solvent

In the traveling solvent method, a temperature gradient is established across a sandwich consisting of two SiC crystals separated by a solvent zone of molten chromium. The solubility of SiC in the chromium is greater on the hot side of the sandwich so that a concentration gradient is set up and the dissolved SiC diffuses across the liquid layer and precipitates on the crystal on the cool side of the sandwich. The precipitated layer incorporates the doping of the dissolved SiC so that p-n junctions can be grown (L. B. Griffith and A. I. Mlavsky, J. Electrochem. Soc. 111, 805, (1964)) and L. B. Griffith, J. Appl. Phys. 36, 571 (1965). Diodes prepared by this process are relatively low in brightness and require relatively high voltages, 12–15 volts compared to 3–4 volts for diodes according to our invention for comparable current densities. Griffith's paper indicates that diodes made by his process have wide intrinsic layers in their junctions and we have found that this is an undesirable characteristic in a light-emitting diode.

Junctions by diffusion

Dopants may also be diffused into silicon carbide crystals by heating the crystals for periods from a few minutes to several hours at temperatures above 1800° C. Under these conditions silicon carbide will decompose unless certain precautions are taken. One way is to surround the crystals with a protective charge of powdered SiC in sufficient thickness that, despite decomposition of the outer part of the charge during the diffusion process, enough will remain to generate a protective atmosphere. Thus a common feature in the diffusion process is a double crucible consisting of an inner porous graphite container to hold the crystals, inside a larger graphite container filled with powdered SiC. This double crucible is then typically placed inside a graphite tube resistance heater in a stream of inert gas (helium or argon) to be heated to the diffusion temperature. The dopants to be diffused are placed in a separate container upstream from the crystals in the flowing gas so that the vapor of the dopants is swept toward the crystals. At the prevailing temperatures, the dopant diffuses through the graphite containers and the SiC powder and into the crystals.

The diffusion technique has been used to make rectifying diodes for use in power rectifiers operating at high temperatures (H. C. Chang, C. Z. May and F. Wallace, "Silicon Carbide a High Temperature Semiconductor," Proc. Conference on Silicon Carbide, Boston, April 1959, Pergamon Press, 1966, p. 496). It has also been used to produce electroluminescent junctions (E. E. Violin and G. F. Kholuyanov, Soviet Physics-Solid State 6, 465 (1964)). However electroluminescent junctions produced by this technique are relatively low in brightness and in conductivity, that is they produce relatively high voltage drops without commensurate production of light.

Summary of the invention

One aspect of our invention is a novel process for preparing silicon carbide crystals having diffused p-n junctions with an adjacent luminescent or phosphor layer which gives better control of the concentration and distribution of the dopants and thereby of the end product. Another aspect of our invention resides in the internal structure of the silicon carbide crystal diode, particularly distribution of dopants and gradient of the concentration about the junction which determines the relative number of holes and electrons available for injection across the junction and the width of the space charge region.

In our novel method of preparing diffused junctions, we surround the silicon carbide crystals in which junctions are to be formed with a protective charge which produces the vapors of silicon and carbon corresponding to silicon carbide, and which serves simultaneously as a source of boron and aluminum dopants diffusing into the crystals, and as a sink for nitrogen diffusing out of the crystals. One way of doing this is to place the crystals in a porous graphite crucible and to surround the crucible with a protective charge of silicon and carbon powders instead of silicon carbide powder as has been used heretofore. Into the protective charge of silicon and carbon powders, we mix the boron and aluminum dopants, and the whole is purged of nitrogen before firing. Under heat, the silicon and carbon react to form silicon carbide grains containing a uniform concentration of boron and aluminum throughout the grains with the least possible concentration of nitrogen. Since the grains surround the crucible, a uniform concentration of dopants is assured in the vapor and results in a well-controlled concentration of dopants at the surface of the crystal throughout the diffusion process, the concentration being essentially equal to that in the grains. At the same time, the grains of the protective charge by reason of their low concentration of nitrogen, serve as a sink for nitrogen which diffuses out from the SiC crystals. By promoting the out-diffusion of nitrogen during the in-diffusion of boron and aluminum, an impurity profile is produced in the crystal that is very beneficial to light production. We have also found that there is an optimum concentration of boron in the silicon and carbon protective charge for best results which varies with the temperature at which diffusion is carried out.

The improved electroluminescent silicon carbide diodes of our invention differ from the prior art by reason of the impurity profile. The donor (nitrogen) concentration is a maximum in the bulk and diminishes in the direction of the diffusion face. The acceptor (boron) concentration is a maximum at the diffusion face and diminishes in the direction of the interior. This means that at the junction occurring at equality in donor and acceptor concentrations, the gradient of the donor is opposite to that of the acceptor. Hence the net acceptor gradient $$\Delta\frac{(N_A-N_D)}{\Delta x}$$

is greater than it would be if only the acceptor concentration were changing (wherein $N_A$ is the acceptor concentration, and $N_D$ the donor concentration at a depth $x$ from the diffusion face). A steep gradient in the net acceptor concentration entails a narrow space charge region, and such a profile produces more efficient injection of the holes needed for the light-producing process. The bulk of the crystal is n-type alpha-SiC containing $0.5\times10^{18}$ to $8\times10^{18}$ effective donors per cm.$^3$, the donors being essentially nitrogen. By effective density of donors is meant the density of donors minus the density of acceptors in the bulk-crystal. The effective density of donors was determined by calculating the density of free electrons from values of Hall voltage measured at a temperature high enough to ionize all of the donors (1000° K.). In the diffused region of the crystal, a concentration of boron acceptors is provided at the surface which is several times greater, preferably at least 10 times greater, than the concentration of effective donors in the bulk. The concentration in the diffused region diminishes inwardly with a gradient from $5\times10^{22}$ to $2.0\times10^{24}$ cm.$^{-4}$ (atoms per cm.$^3$ per cm.). The stated gradients result in a width of the space charge region about the junction from .02 to .25 microns. Adjacent to the junction there is a phosphor layer in which radiative recombinations take place by way of donor-acceptor recombination centers. In this instance where the donor is nitrogen and the acceptor is boron, the phosphor layer is formed on the n-side and is several microns thick. Light-emitting diodes made from such crystals are several times brighter than prior art crystals.

While the method of our invention provides the most convenient way that we know of to make our improved crystal junctions, other methods may be used producing similar concentrations of dopants and gradients, even though the accuracy of control may be less.

Starting material

The starting material consists of green nitrogen-doped alpha SiC crystals containing an effective donor concentration from $0.5\times10^{18}$ to $8.0\times10^{18}$ cm.$^{-3}$, preferably $1.8–2.5\times10^{18}$. They may be prepared by the Lely technique, preferably modified as described in the paper by A. Addamiano, R. M. Potter and V. Ozarow, J. Electrochem. Soc. 110, 517 (1963). A typical rough crystal is illustrated at 1*a* in FIG. 1 and may be approximately 5⁄16" across and .050" to .1" thick. Usually the crystal planes may be seen along some but not all of the edges; in the illustration four of the edges are perfectly formed. The crystals are ground and polished with diamond paste to obtain plane surfaces perpendicular to the *c*-axis prior to diffusion, as shown at 1*b*; the thickness of the polished crystal is approximately .020".

Furnace apparatus

Figure 3:
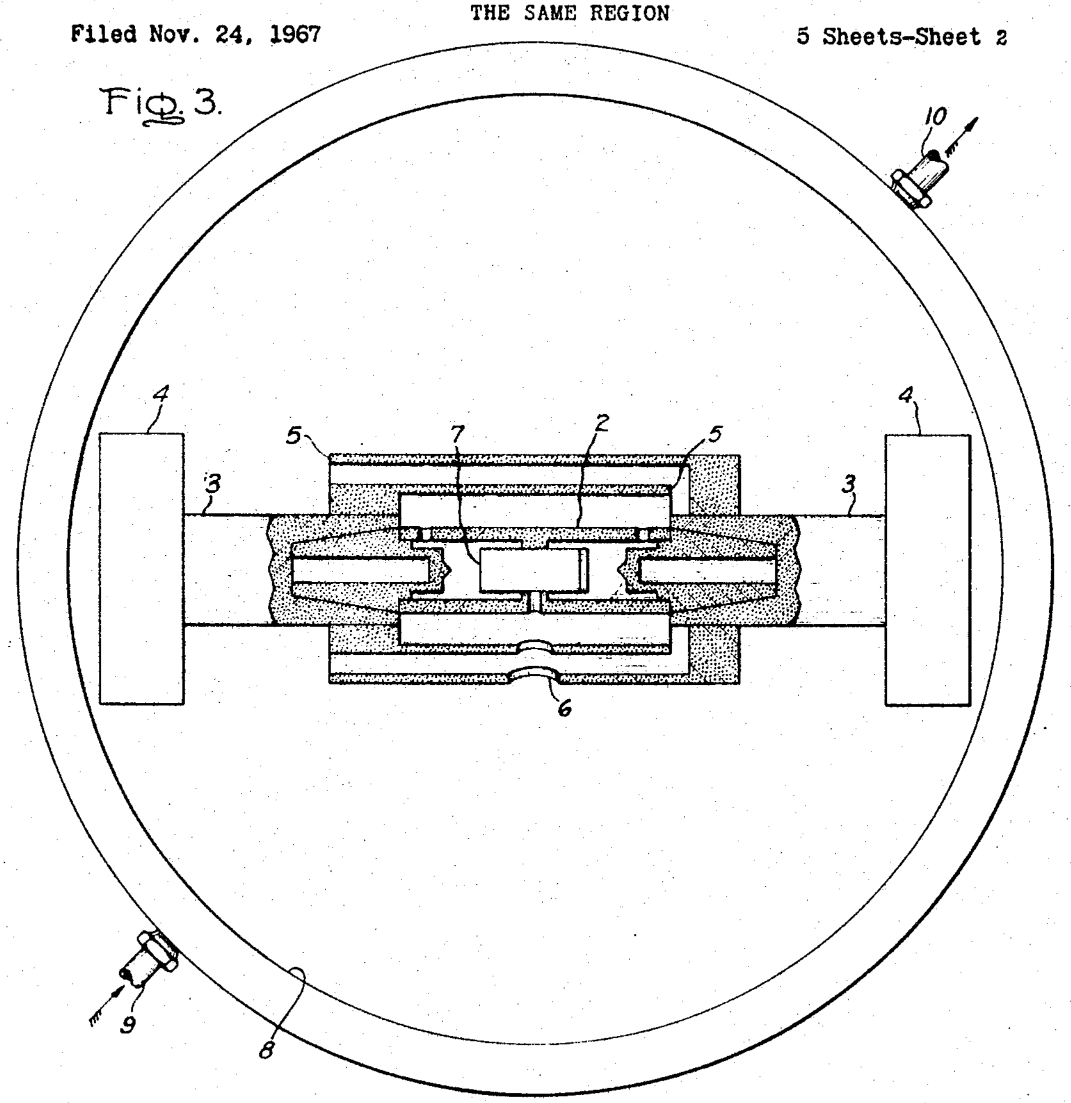
FIG. 3 is a diagrammatic illustration of a furnace apparatus suitable for diffusion formation of p-n junctions in SiC crystals.

A furnace suitable for growing junctions in SiC crystals by diffusion is illustrated in FIG. 3 and comprises a hollow graphite electric resistance heater 2 engaged between graphite current terminals 3 which in turn are engaged in massive copper electrodes 4 which are water-cooled. Concentric graphite shields 5 around the heater cut down the heat loss and a peep hole 6 gives optical access for a pyrometer to a crucible 7 within the heater. The whole is located inside a double-walled chamber 8; the chamber may be evacuated and flushed with gas. Cooling water is circulated through the walls, the inlet and the outlet being indicated at 9 and 10 respectively.

Figure 4:
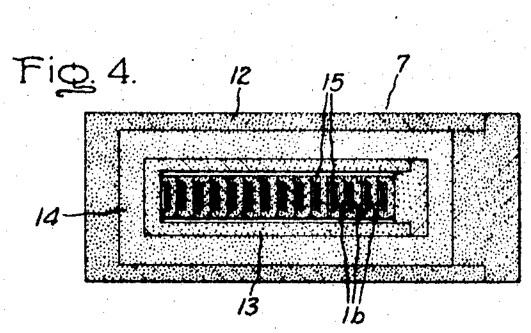
FIG. 4 is a cross section through the crucible used with the furnace of FIG. 3 and in which diffusion takes place.

The graphite crucible 7 centrally located within the heater is double-walled. As shown in FIG. 4, the outer wall 12 of the crucible is made of dense graphite while the inner wall 13 is made of porous graphite. A protective charge 14 of silicon and carbon with which are admixed the aluminum and boron dopants is located in the intramural cavity between outer and inner walls. The inner volume of the crucible is divided into smaller compartments by porous graphite spacers 15. Conveniently the spacers may be shaped as discs with a raised lip around the circumference on one side.

Diffusion process

Figures 1, 2A, 2B, 2C:
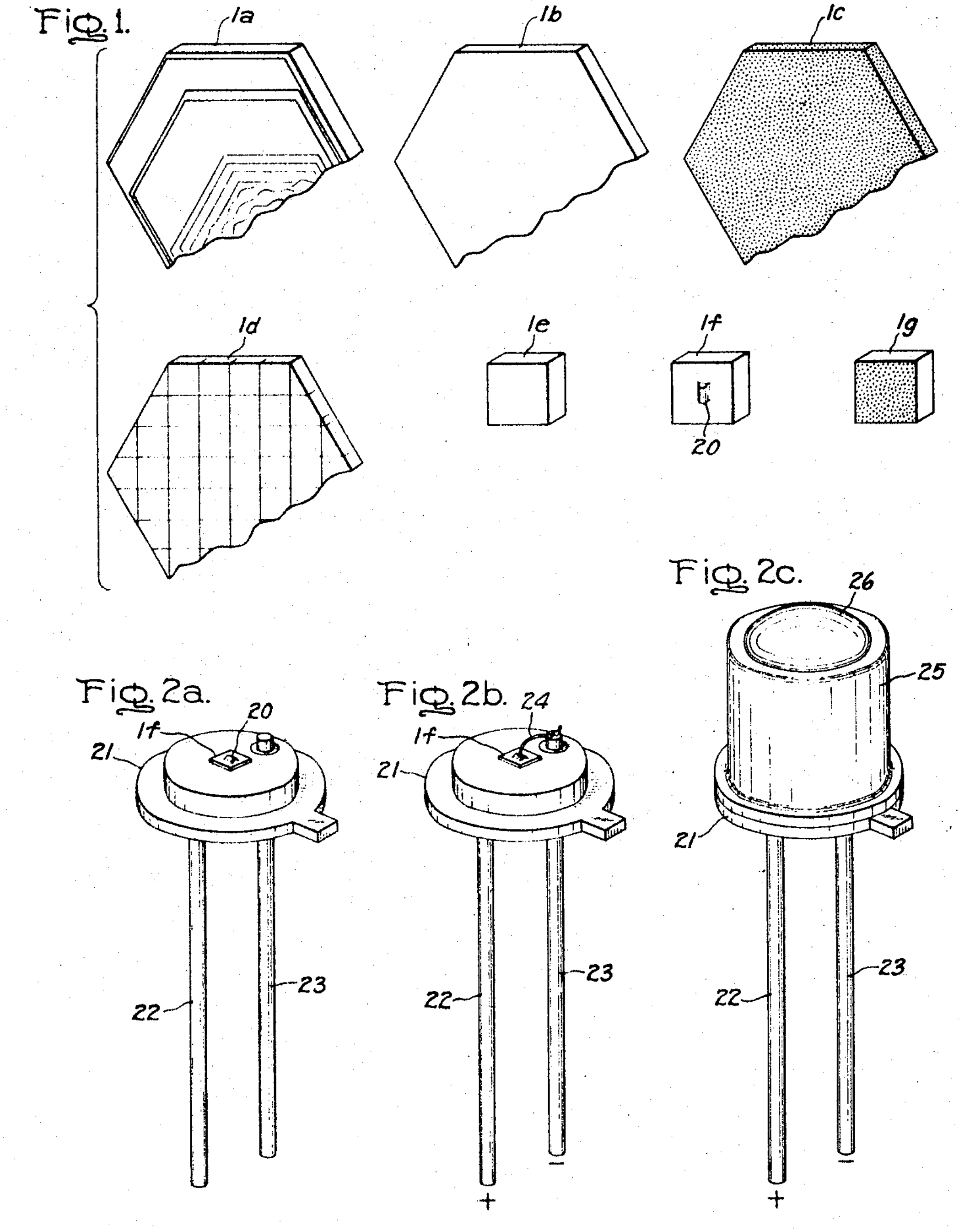
FIG. 1 illustrates successive stages in the preparation of a silicon carbide light-emitting crystal chip or die.
FIGS. 2*a* to *c* illustrate successive stages in the assembly of a SiC die into a diode device or lamp.

Polished SiC crystals as shown at 1*b* in FIG. 1 are placed in the crucible, one per compartment in the inner chamber. If more than one crystal are placed in a compartment, they may touch and become joined together at the contract during the diffusion process. The intramural cavity within the crucible is filled with the protective charge consisting of a mixture of silicon powder and carbon powder with which is admixed the boron and aluminum dopants. The boron should be in a finely divided state to assure uniform distribution and boric acid is most convenient to use. The aluminum need not be finely divided as its relatively high vapor pressure suffices for good distribution. We have used various diffusion temperatures upwards from 1900° C. and various concentrations of boron with results to be described in greater detail hereafter.

In order to promote out-diffusion of nitrogen from the crystals in accordance with our invention, the nitrogen level in the ambient gas is made as low as possible. To this end the diffusion furnace is evacuated and backfilled several times with argon before heat is applied. Then with argon flowing through the furnace at about 2 liters per minute, the temperature is raised to 1300° C. for 1 hour. The temperature is next raised to 1450° C. for one hour, and beginning at about 1400° C. the protective charge of silicon and carbon reacts to form silicon carbide in which the boron and aluminum dopants are uniformly distributed throughout the bulk of the grains. Next the temperature is raised to 1600° C. for one hour to allow further out-gassing of the furnace and charge. Finally, the furnace is heated to the diffusion temperature and argon flow is continued throughout.

During the diffusion time, which may vary from a few minutes to several hours, the protective charge maintains a vapor pressure in the inner chamber which prevents dissociation of the crystals while allowing the boron and aluminum to diffuse into them and some nitrogen to diffuse out. The vapor pressure of the dopants is determined by the concentration in the grains and results in a surface concentration in the SiC crystals approximately equal to the concentration in the bulk of the grains. This applies not only to B and Al which are diffusing in, but also to N which is diffusing out. Diffusion creates a p-type surface layer, 0.1 to 10 microns thick, on both flat faces of the crystals and completely encasing them as shown at 1*c* in FIG. 1. Under the p-layer there is formed a partially compensated n-type luminescent or phosphor layer of composition corresponding to the luminescent material described in copending application Ser. No. 423,326, filed Jan. 4, 1965 by Arrigo Addamiano, entitled "Silicon Carbide Luminescent Material," and similarly assigned. In this luminescent layer, which is from about 1 to 30 microns thick, recombination of holes projected across the junction with electrons causes light to be generated.

While we prefer to use a fresh protective charge of silicon and carbon with boron and aluminum dopants for a diffusion, a previously used charge which has been reacted into silicon carbide may be reused provided the level of boron and aluminum dopants has not been appreciably lowered and the concentration of absorbed nitrogen is still relatively low. It will also be appreciated that it is not essential to use a charge of silicon and carbon; a charge of granular silicon carbide may be used providing it has been prepared under conditions assuring the desired uniform concentration of dopants throughout the grains and freedom from nitrogen. In practice, however, the economics of the situation are such that the use of silicon and carbon as described is most economical.

Diode making

To make light-emitting diodes or lamps from the diffused crystals, the p-type layer is ground off on one side of a crystal to expose the original n-type bulk crystal. Grinding reduces the thickness of the crystal to about 0.010–0.015". The crystal is then cut along lines such as shown at 1*d* in FIG. 1 to form square dice approximately 1 mm. x 1 mm. in size shown at 1*e*. A large area ohmic contact is made to the p-type side of a die or square chip. The p-layer is very thin and it is desirable to use a process for containing that will not disturb the crystal beyond a few tenths of a micron. A suitable way is to apply a dispersion of aluminum in an organic solution of silicon which releases the aluminum and silicon upon heating and forms a shiny layer of Al-Si eutectic over the p-layer as shown at 1*g*. Ohmic contact is then made to the n-side by fusing a gold-tantalum alloy in the form of a small dot 20 to the n-type side as shown at 1*f*.

For convenience in use, the die is mounted on a header. A suitable transistor-type header is shown in FIG. 2*a* and comprises a stepped gold-plated metal base disc 21 to whose underside is attached a ground lead wire 22. Another lead wire 23 projects through the base but is insulated therefrom. The SiC die 1*f* is conductively attached p-side down to the header disc, suitably by a gold filled epoxy cement, or alternatively by soldering. A gold wire 24 is thermo-compression bonded to the gold tantalum dot on the top side of the die, bent over laterally and thermo-compression bonded to the top of lead wire 23 projecting through the disc, as shown in FIG. 2*b*.

The lamp lights upon applying a few volts of forward bias, that is, positive to lead 22 connected to the base disc and the p-side, and negative to insulated lead 23 connected to the n-side. Typically, a forward voltage of 3.5 volts causes a current of 50 milliamperes at 25° C. ambient temperature and this produces a brightness viewed end-on of 40 footlamberts with a peak spectral emission at 5900 A. The light is yellowish-green with a band width (.707 peak) from 5500 to 6300 A.

The header may be capped by a metal can or cover 25 equipped with a lens 26 in its end wall as shown in FIG. 2*c*, whereby to enclose and protect the die. The can may be attached to the base disc by spot welding. Alternatively an all-glass cap may be used which is most conveniently cemented to the base disc.

As an alternative to the gold-tantalum dot and gold wire connection, wires of iron or nickel chromium alloys including various stainless steels may be fused directly to the n-side of the SiC die, as described and claimed in copending application Ser. No. 604,125 of Arrigo Addamiano, filed Dec. 23, 1966, entitled "Semiconductive Crystals of Silicon Carbide With Improved Electrical Contacts," and assigned to the same assignee as this application.

Junction profile

Figure 5:
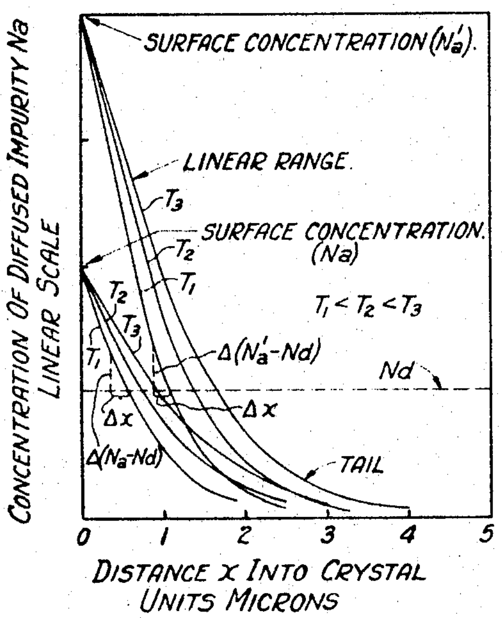
FIG. 5 is a graph showing idealized variation of concentration of diffused impurities with depth into a crystal at different surface concentrations according to accepted theory (Fick's Law).

We believe that the improvements in our electroluminescent diodes are due to the unique junction profile which results from the concentrations and gradients of the impurities or dopants. These terms and the concepts involved may be better understood by reference to FIG. 5 which illustrates the variation in concentration of a diffused impurity with depth into a crystal when a constant surface concentration is maintained and assuming Fick's law of diffusion to be obeyed. Typical curves for two surface concentration levels $N_a$ and $N_d$ and three temperatures T1, T2 and T3 in ascending magnitude are plotted. Significant features are: (1) A nearly linear variation of concentration with distance occurs over a considerable range of distance before a more gradual variation occurs in the "tail." (2) Increasing the surface concentration with diffusion temperature and time unchanged, causes deeper peneration of the diffused impurity and a larger net gradient $$\Delta\frac{(N_a-N_d)}{\Delta x}$$

of the diffused acceptor impurity. (3) Increasing the diffusion temperature for the same surface concentration and time causes deeper penetration and a smaller net gradient of the diffused acceptor impurity. (4) Maximum net gradient is obtained with the higher surface concentration $N_a$ and lowest diffusion temperature $T_1$. Minimum net gradient is obtained with the lower surface concentration $N_a$ and highest diffusion temperature $T_3$.

Figure 6:
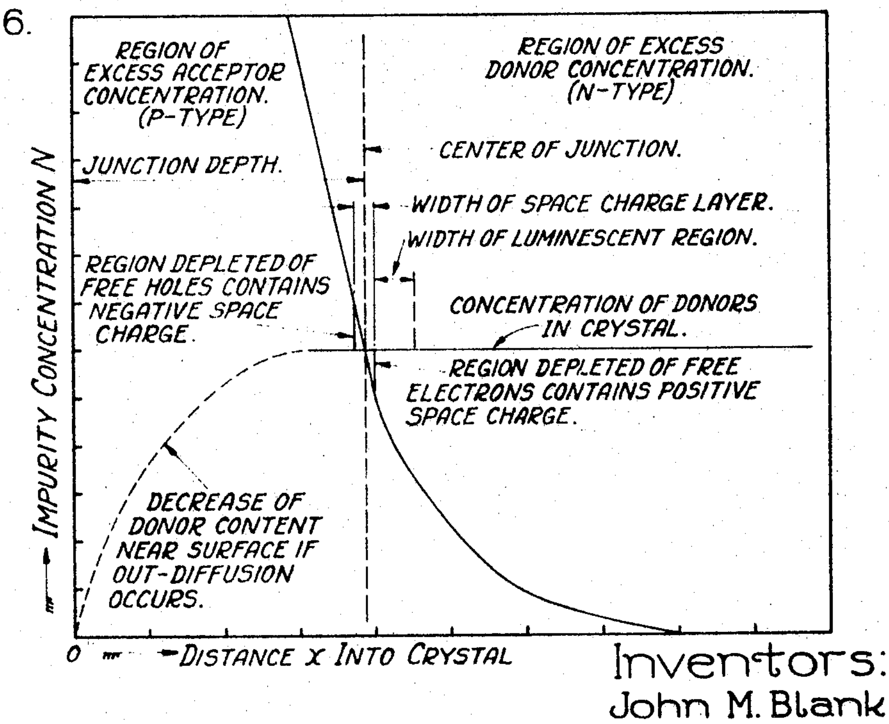
FIG. 6 shows various concepts relating to impurity concentrations and junctions in semiconductors.

By way of further definition, FIG. 6 illustrates some concepts connected with the p-n junction which forms when an acceptor impurity is diffused to the right into a crystal containing an appreciable donor concentration. The junction occurs at the depth $x$ where $N_a=N_d$. Next to the junction on the left side is a region depleted of free holes or acceptor sites and containing negative space charge, while on the right side is a region depleted of free electrons and containing positive space charge; these two regions constitute the space charge layer. Next to the space charge layer on the right is a luminescent or phosphor region wherein holes projected across the junction recombine with electrons and simultaneously release a photon of light.

Figure 7:
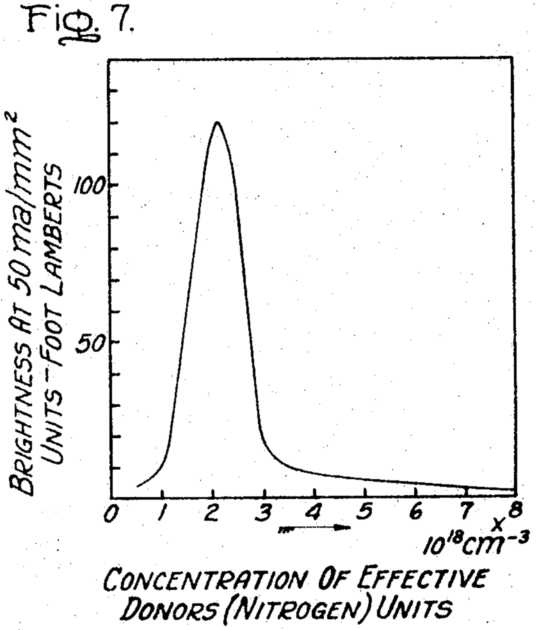
FIG. 7 shows variation in brightness against effective donor concentration.

We have found that effective donor (nitrogen) concentrations of 0.5 to $8.0\times10^{18}$ cm.$^{-3}$ in the SiC crystal are desirable. The range of 1.8 to $2.5\times10^{18}$ cm.$^{-3}$ is preferred for crystals where the acceptor impurity level in the bulk is about $1\times10^{17}$ cm.$^{-3}$ and gives maximum brightness as is illustrated in FIG. 7 wherein brightness of emitted light is plotted against effective donor concentration in the starting crystal. It is seen that concentrations near $2\times10^{18}$ cm.$^{-3}$ give best results for such crystals.

Figure 8:
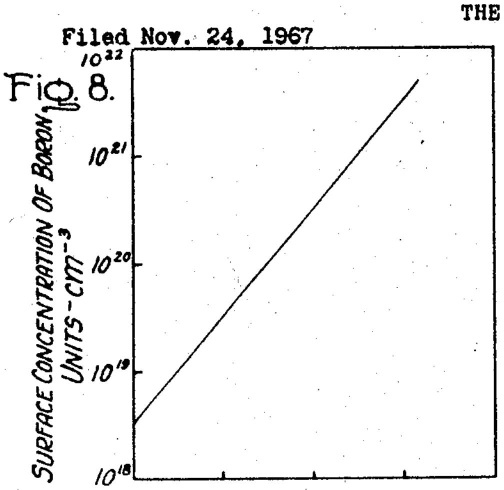
FIG. 8 shows surface concentration of boron against weight percent boric acid in the protective charge.

The surface concentration of boron acceptor in SiC crystals treated by our diffusion process depends upon the weight percent boron or boric acid added to the protective charge of silicon and carbon. FIG. 8 shows the relationship assuming equality between surface concentration of boron in the crystal and concentration in the protective charge. In practice there is little departure and the results obtained are consistent with related properties such as concentration gradient which have been measured.

Figure 9:
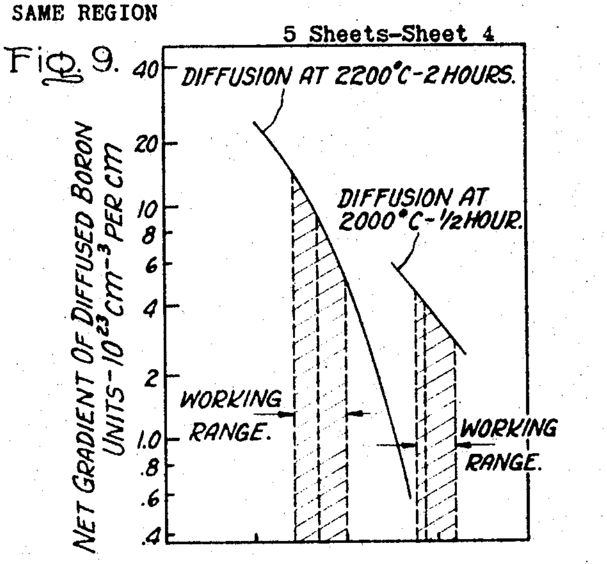
FIG. 9 shows the net gradient of acceptors at the junction against weight percent boric acid in the protective charge.

FIG. 9 presents the boric acid requirement of the protective charge for achieving a given gradient with diffusion at 2200° C. for 2 hours which is near optimum for bright light-emitting diodes. The requirement with diffusion at 2000° C. for ½ hour is also presented for comparison. The measured net gradient $$\Delta\frac{(N_a-N_d)}{\Delta x}$$

in the diffused crystal changes with weight percent boric acid addition to the protective charge; surprisingly it increases when the boric acid addition is decreased. This behavior is in the opposite direction to the prediction from Fick's law in the presence of constant $N_d$ (FIG. 5) and constitutes an anomaly. Also, the gradient is higher with the higher temperature diffusion, contrary to the prediction, and thus another anomaly is presented. In fact the optimum (highest net gradient) is found with the lower surface concentration and the highest diffusion temperature, the very opposite of the prediction based on Fick's law. The explanation for these unexpected results will appear shortly.

The working range of boric acid addition for light-producing diodes extends from about 0.3 wt. percent to 15 wt. percent, and the working range of net acceptor gradient is from $5\times10^{22}$ to $2\times10^{24}$ cm.$^{-4}$ or atoms per cm.$^3$ per cm. Boric acid is merely the most convenient and inexpensive compound to use in order to provide boron in a finely divided state; boron or other boron-releasing compounds could also be used. One gram of boric acid contains 0.175 gram of boron and conversion may be made on this basis; both scales are shown in FIGS. 8 to 11 and 13. The working range of boron addition extends from 0.05 wt. percent to 2.63 wt. percent in the protective charge of silicon and carbon. The best diodes have been produced by diffusions at 2200° C. for which the working range is 0.3 wt. percent to 1.0 wt. percent boric acid, or 0.05 wt. percent to 0.175 wt. percent boron.

Figure 10:
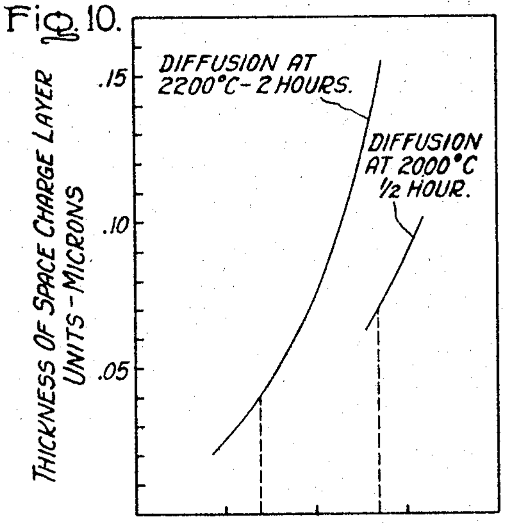
FIG. 10 shows thickness of the space charge layer against weight percent boric acid in the protective charge.

FIG. 10 shows the variation in measured thickness of the space charge layer with the amount of boric acid addition to the protective charge. The working range of space charge layer thickness is from .02 to .25 microns and the preferred range is from .04 to .10 microns. The brightest diodes produced by diffusions at 2200° C. have a space charge layer thickness from .05 to .07 microns.

Figure 11:
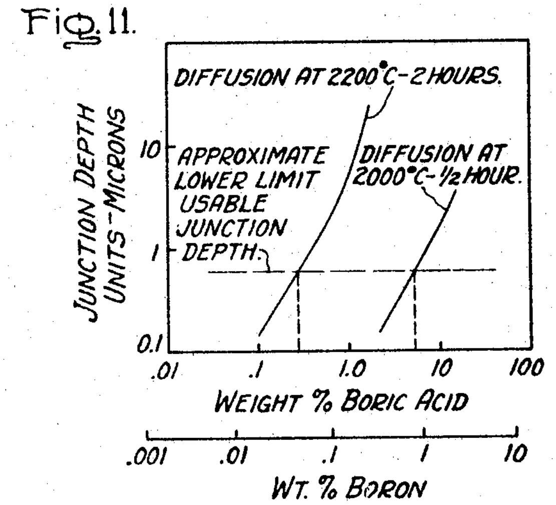
FIG. 11 shows the variation in junction depth against weight percent boric acid in the protective charge.

FIG. 11 shows the variation in junction depth $x$ from the diffusion face. This is consistent with the gradients and surface concentrations previously described. The junction depths are relatively small in the working range of boric acid additions delineated. The lower limit of usable boric acid is fixed by the depth of the junction because any lesser junction depth results in a "leaky" diode wherein current flows without producing light. In the small junction depths encountered within the working range, substantial out-diffusion of nitrogen donors takes place and this is a desirable effect which our process is designed to encourage.

Figure 12:
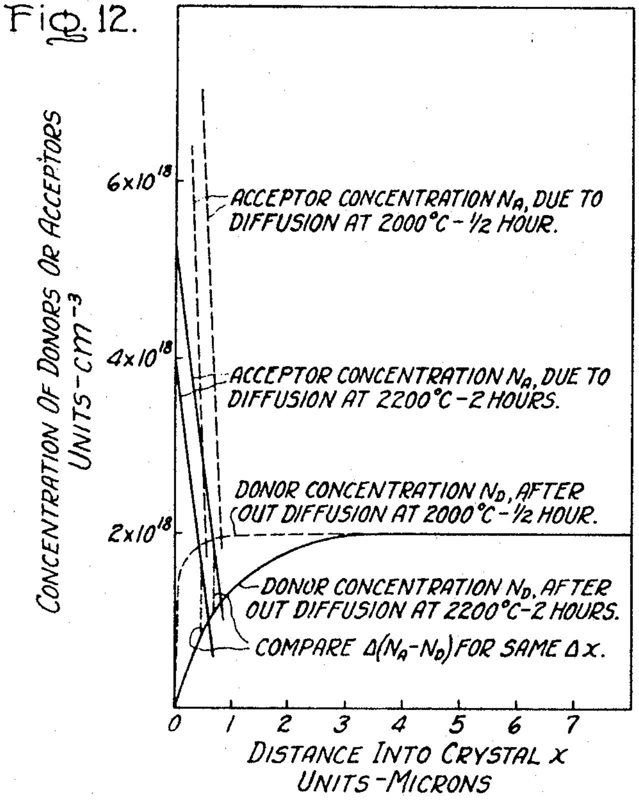
FIG. 12 shows the variation in net gradient of acceptors when both acceptor and donor concentrations vary with depth into the crystal.

The explanation for the steep gradients in net acceptor concentration which we achieve at higher diffusion temperatures and lower surface concentration and which seem "anomalous" in respect of Fick's law, appears to reside in out-diffusion of nitrogen from the silicon carbide crystals while in-diffusion of boron is taking place. In FIG. 12, the curves of acceptor concentrations $N_a$ associated with two different surface concentrations are shown. The higher concentration corresponding to a 2000° C. diffusion is shown in dotted lines, and the lower concentration corresponding to a 2200° C. diffusion is shown in solid lines. The corresponding donor concentrations $N_d$ are similarly indicated. The acceptor concentration curve for a 2200° C. diffusion (solid line) intersects the donor concentration curve in a region of high slope by contrast with the 2000° C. case (dotted line). The net acceptor gradient at the junction results from the difference between the two slopes. Although the acceptor gradient $\Delta N_a/\Delta x$ by itself is less steep at the higher temperature, the donor gradient which occurs at the same time has a reverse slope and there results a steeper net acceptor gradient $$\Delta\frac{(N_a-N_d)}{\Delta x}$$

This explains the second anomaly previously observed. Also, comparing the gradients observed with minor changes in boron surface concentration indicated by the twin sets of acceptor concentration lines, the lesser concentration achieves the higher net gradient because the intersection with the donor concentration curve occurs closer to the crystal surface (left edge) where the curve is steeper. This explains the first anomaly previously pointed out and the surprising fact that the optimum (highest net gradient) is found at relatively low surface concentration of boron and high diffusion temperature contrary to expectations.

Our brightest diodes have been made at the higher diffusion temperatures (2200° C.) and measurements confirm that they have the steeper net gradients corresponding to the solid line curves in FIG. 12. A steep gradient entails a narrow space charge region and there appear to be two reasons why this results in brighter diodes. (1) The narrow space charge region reduces the possibility of electron-hole recombination in such region where light production is relatively inefficient, and promotes recombination in the n-type luminescent region immediately beyond the space charge region on the n-side (see FIG. 6) where light production is relatively efficient. (2) In wide band gap semiconductors such as SiC and particularly where heavy compensation occurs as near a junction, the concentration of free holes is given by $$P=\frac{N_a-N_d}{N_d}\cdot N_v e^{-\frac{E_a}{kT}}$$

where $N_v$=Density of states in the valence band
$E_a$=Activation energy for acceptors
$k$=Boltzmann constant
T=Absolute temperature.

Clearly the concentration of free holes is benefitted by a small value of $N_d$, that is by having the junction occur at low donor (nitrogen) concentration. Since light production is accomplished by the injection of holes into and across the junction, it is benefitted for the same reason.

Figure 13:
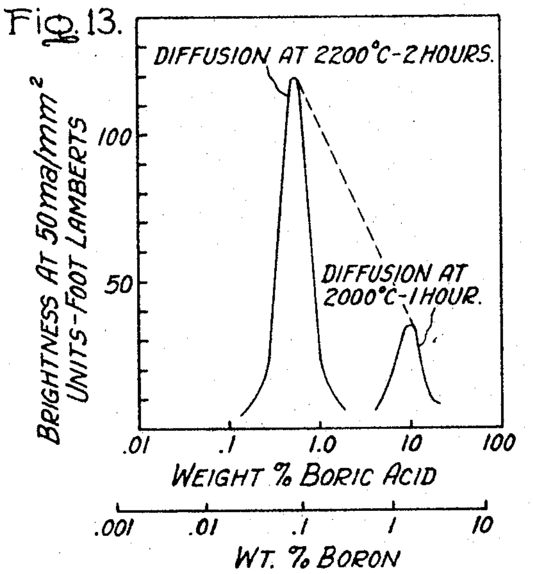
FIG. 13 shows the difference in brightness of crystals with diffusion optimized at different temperatures.

FIG. 13 indicates the relative brightness of lamps or diodes made from crystals diffused at 2000° C. and 2200° C. The curves are indicative of data obtained from sampling a substantial number of production runs. For typical lamps diffused at 2000° C., measurements show a junction width of .08 to .10 microns and a brightness of 25 footlamberts at 50 milliamperes per mm.². For typical lamps diffused at 2200° C., junction width varies from .05 to .07 microns, and brightness is 80 footlamberts under the same conditions. Some lamps diffused at 2200° C. had a brightness of 120 footlamberts.

Figure 14:
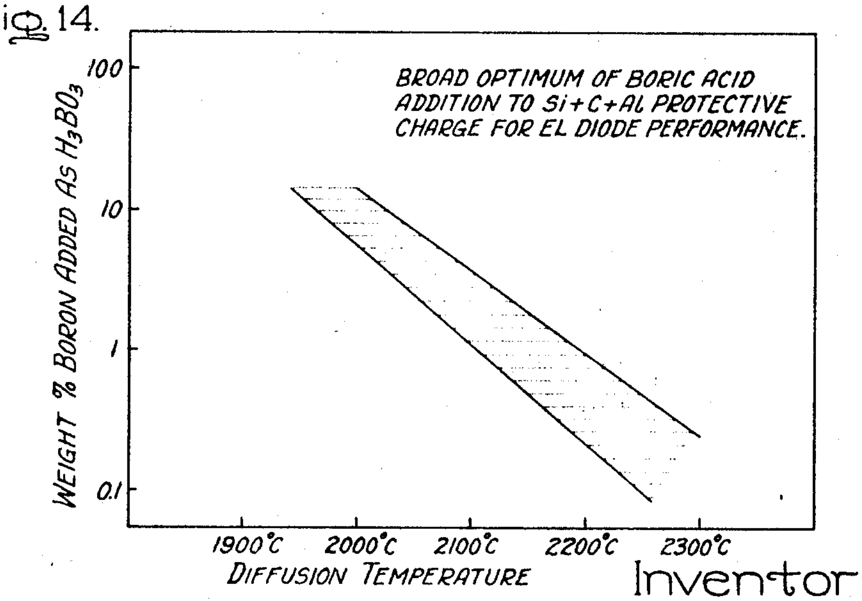
FIG. 14 shows the broad optimum of boric acid addition to the protective charge over the range of diffusion temperatures.

In general the desired boric acid addition to the silicon and carbon protective charge decreases with increasing diffusion temperature. The range of desirable additions is that shown by the crosshatched area in FIG. 14.

The function of the aluminum is primarily to assure good conductivity at the surface on the p-side where an ohmic contact is made. For this reason aluminum is desirable but the gradient of its concentration is so much steeper than that of the boron that its contribution is overshadowed by the boron. Consequently the concentration of aluminum in the protective charge is not critical and 0.3 to 3 wt. percent has been found acceptable.

Thus the different diffusion process which we use results in a signficantly improved product and our crystals are physically different from any obtained heretofore. Where we have been able to get adequate data from the published literature, for instance Violin and Kholuyanov, Soviet Physics-Solid State 6,465 (1964), our calculations indicate that in our crystals the gradient of the excess concentration of the diffused acceptor impurity over donor impurities is steeper and the width of the space charge region at the junction is smaller by substantial amounts.

What we claim as new and desire to secure by Letters Patent of the United States is:

1. A p-n silicon carbide electroluminescent diode comprising an SiC crystal, whereof the bulk is n-type containing a donor impurity, said crystal having next to one surface a diffused region wherein the donor concentration diminishes outwardly toward said surface, said region having in addition an acceptor concentration which at the surface exceeds the concentration of donors thereat and which diminishes inwardly from said surface, the acceptor concentration and gradient being such that the junction occurring at equality in acceptor and donor concentrations is located at a depth from said surface where both donor and acceptor concentrations have substantial gradients in opposite directions, whereby a high net acceptor gradient is present and a narrow space charge region is achieved at the junction, and a luminescent layer adjacent to said junction wherein radiative recombinations may take place by way of donor-acceptor recombination centers.

2. A silicon carbide electroluminescent diode as in claim 1 wherein the donor impurity in the bulk is primarily nitrogen in a concentration from $0.5\times10^{18}$ to $8.0\times10^{18}$ effective donors per cm.³.

3. A silicon carbide electroluminescent diode as in claim 1 wherein the donor impurity in the bulk is primarily nitrogen in a concentration from $1.8\times10^{18}$ to $2.5\times10^{18}$ effective donors per cm.³.

4. A silicon carbide electroluminescent diode as in claim 2 wherein the acceptor impurity is primarily boron.

5. A silicon carbide electroluminescent diode as in claim 3 wherein the acceptor impurity is primarily boron.

6. A p-n silicon carbide electroluminescent diode comprising an SiC crystal, whereof the bulk consists essentially of nitrogen-containing n-type alpha-SiC containing $0.5\times10^{18}$ to $8.0\times10^{18}$ effective donors per cm.³, said crystal having next to one surface a diffused region wherein the concentration of donors diminishes outwardly toward said surface, said diffused region having in addition a concentration of boron acceptors at the surface at least 10 times greater than the concentration of donors in the bulk, the concentration of acceptors in said diffused region diminishing inwardly from said surface at a rate providing a net acceptor gradient from $5\times10^{22}$ to $2.0\times10^{24}$ cm.$^{-4}$ whereby the junction occurring where acceptor and donor concentrations become equal results in a narrow space charge region having a width from .02 to .25 microns, and a luminescent layer adjacent to said junction wherein radiative recombinations may take place by way of donor-acceptor recombination centers.

7. A silicon carbide electroluminescent diode as in claim 6 wherein the space charge region has a width from .04 to .10 microns.

8. A silicon carbide electroluminescent diode as in claim 6 wherein the space charge region has a width from .05 to .07 microns.

9. A silicon carbide electroluminescent diode as in claim 6 wherein the bulk contains from $1.8 \times 10^{18}$ to $2.5 \times 10^{18}$ effective donors per cm.$^3$.

10. A silicon carbide electroluminescent diode as in claim 6 wherein the bulk contains from $1.8 \times 10^{18}$ to $2.5 \times 10^{18}$ effective donors per cm.$^3$ and the space charge region has a width from .05 to .07 microns.

11. A silicon carbide electroluminescent diode as in claim 6 wherein the bulk contains approximately $2 \times 10^{18}$ effective donors per cm.$^3$ and the space charge region has a width from .05 to .07 microns.

12. The method of forming an electroluminescent p-n junction in SiC which comprises:

obtaining a nitrogen-containing alpha-SiC crystal containing $0.5 \times 10^{18}$ to $8.0 \times 10^{18}$ effective donors per cm.$^3$, surrounding the SiC crystal with a protective charge providing the vapors of silicon and carbon corresponding to SiC and serving as a source of boron and a sink for nitrogen, and heating the crystal and protective charge to a temperature in the range from 1900 to 2600° C. in an inert atmosphere at a pressure sufficient to prevent pitting of the crystal surface and for a time sufficient to produce a p-n junction by inward diffusion of boron into and outward diffusion of nitrogen from the crystal.

13. The method of claim 12 wherein the protective charge consists essentially of an equimolar mixture of silicon and carbon along with boron dopant, and wherein said charge in purged of nitrogen prior to heating to the stated temperature range.

14. The method of claim 13 wherein the protective charge also contains aluminum dopant.

15. The method of claim 13 wherein the proportion of boron in the protective charge is from .005 to 2.63 wt. percent.

16. The method of forming an electroluminescent p-n junction in SiC which comprises:

obtaining a nitrogen-containing alpha-SiC crystal containing $0.5 \times 10^{18}$ to $8.0 \times 10^{18}$ effective donors per cm.$^3$, placing the SiC crystal in a porous carbon crucible, surrounding the crucible with an equimolar protective charge of silicon and carbon containing boron dopant, purging the protective charge of nitrogen, and heating the crucible and protective charge to a temperature in the range from 1900 to 2600° C. in an inert atmosphere at a pressure sufficient to prevent pitting of the crystal surface and for a time sufficient to produce a p-n junction by inward diffusion of boron and outward diffusion of nitrogen.

17. The method of claim 16 wherein the proportion of boron in the protective charge is from .005 to 2.63 wt. percent.

18. The method of claim 16 wherein the proportion of boron in the protective charge is from .005 to 0.175 wt. percent and the crucible is heated to a temperature of about 2200° C.

19. The method of claim 16 wherein the proportion of boron in the protective charge is from .005 to 2.63 wt. percent. and aluminum is also added to said charge in a proportion from 0.3 to 3 wt. percent.

References Cited

UNITED STATES PATENTS

| | | | |
|---|---|---|---|
| 3,389,022 | 6/1968 | Kravitz | 148—174 |
| 3,404,304 | 10/1968 | Bonin | 313—108 |
| 3,308,356 | 3/1967 | Rutz | 317—237 |
| 3,377,210 | 4/1968 | Somerville | 148—1.5 |
| 3,236,780 | 2/1966 | Ozarow | 252—301.4 |

OTHER REFERENCES

Violin et al., Soviet Physics Solid State, 6, 465 (1964).

JOHN W. HUCKERT, Primary Examiner

M. EDLOW, Assistant Examiner

U.S. Cl. X.R.

148—186, 191; 313—108; 317—235, 237